United States Patent [19]
Zeller et al.

[11] 4,156,415
[45] May 29, 1979

[54] FUEL-AIR MIXTURE CONTROL APPARATUS

[75] Inventors: Hans Zeller, Grafenau; Johannes Brettschneider, Ludwigsburg, both of Fed. Rep. of Germany

[73] Assignee: Robert Bosch GmbH, Stuttgart, Fed. Rep. of Germany

[21] Appl. No.: 769,498

[22] Filed: Feb. 17, 1977

[30] Foreign Application Priority Data

Feb. 25, 1976 [DE] Fed. Rep. of Germany ....... 2607534

[51] Int. Cl.² .......................................... F02M 23/04
[52] U.S. Cl. ........................... 123/124 B; 123/119 D; 123/119 EC; 123/124 R
[58] Field of Search ........ 123/119 EC, 119 D, 124 R, 123/124 B

[56] References Cited

U.S. PATENT DOCUMENTS

| 3,977,375 | 5/1976 | Laprade et al. | 123/119 D |
| 4,010,722 | 3/1977 | Laprade et al. | 123/119 D |
| 4,037,406 | 7/1977 | Hartel | 123/119 D |
| 4,046,120 | 9/1977 | Laprade et al. | 123/119 D |
| 4,062,337 | 10/1977 | Rivere | 123/124 B |

*Primary Examiner*—Wendell E. Burns
*Attorney, Agent, or Firm*—Edwin E. Greigg

[57] ABSTRACT

The induction tube of an internal combustion engine is provided with a bypass conduit which feeds additional fresh air to the induction tube downstream of the carburetor and the main throttle plate. The flow through the bypass is controlled by a pneumatic control valve which is actuated by selective admission of a mixture of pressures taken from the main induction tube and from ambient sources. The selection takes place on the basis of transducer signals related to engine conditions which are processed by a regulator.

16 Claims, 5 Drawing Figures

FUEL-AIR MIXTURE CONTROL APPARATUS

BACKGROUND OF THE INVENTION

The invention relates to an apparatus for controlling the composition of the fuel-air mixture fed to an internal combustion engine. More particularly, the mixture control device includes a bypass line for providing bypass air to the induction tube of the engine downstream of the mixture generator, for example a carburetor. Within the bypass line there is disposed a throttle member, the movable part of which is actuated pneumatically in accordance with the vacuum provided by a fixed venturi within the main induction tube. The vacuum normally acting on the moving element of the throttle can be replaced by some other pressure via a valve assembly that is itself controlled by a transducer which senses an operational variable of the engine.

In a known apparatus of this general type, the bypass line contains a throttle member, the movable part of which is a control diaphragm which is loaded on both sides by compression springs. This control diaphragm defines two pressure chambers, one of which is connected to a storage volume and to the narrowest portion of a venturi within the induction tube of the engine. By actuating a magnetic valve in a connecting line leading to the atmospheric air, the induction tube vacuum derived there may be changed. The other pressure chamber of the throttle member is connected with the induction tube downstream of the main throttle plate which defines the amount of mixture fed to the engine. By suitable cyclic actuation of the magnetic valve within the connecting line to the ambient air, and in dependence on a signal from an oxygen sensor located in the exhaust system of the engine, and/or by suitable construction of the throttle member itself, it is possible to control the supply of secondary air to be dependent on the air throughput rate through the main induction tube. Furthermore, a final correction based on the signal from the oxygen sensor is possible by changing the venturi vacuum. In this known apparatus, it is further possible to obtain an additional reduction of the bypass air quantity in dependence on the pressure in the induction tube downstream of the throttle plate. However, this known apparatus is capable of only relatively coarse control of the secondary air stream. In particular, it is unable to guarantee that the flow rates within the induction tube and in the bypass line are strictly proportional to one another. This is so because, while the throttle member is displaced as a function of the throughput, the pressure drop across the throttle does not correspond to the conditions within the induction tube. On the other hand, it is a first and principal requirement for effective control in all domains of operation of the engine to provide a proportional preliminary control of the flow rate of the supplied secondary air stream. The known apparatus does not guarantee a multiplicative control influence. In the known apparatus, furthermore, when the throttle plate is closed, the sharply increasing vacuum in the induction tube downstream of the throttle plate either very sharply diminishes or completely interrupts the supply of secondary air.

OBJECT AND SUMMARY OF THE INVENTION

It is a principal object of the invention to provide a fuel supply system which permits a rapid and precise multiplicative influence on the amount of secondary air supplied to the engine. It is a further object of the invention to provide an apparatus which is relatively simple in construction and reliable in operation.

These and other objects are attained, according to the invention, by providing an air bypass line and located therein a fixed reduction of the flow cross section upstream of a throttle member which constricts the flow through the bypass. The throttle member is part of a pressure control valve which has a control element that is pressure-actuated and that defines a work chamber within the bypass line and a pressure control chamber subject to control pressures. The control pressures are selectively admitted by a valve assembly and may derive from various sources.

Preferably, the pressure control valve maintains a constant pressure in the bypass downstream of the narrowed portion although the constant pressure may be influenced by a controller. A multiplicative effect is obtained by the fact that the pressure drop across the venturi and across the narrowed portion in the bypass are both proportional to the square of the air throughput and these pressure drops are in a constant ratio. For this reason, the supplementary air stream delivered to the engine is proportional to the main air stream through the induction tube and the supplementary air stream may be multiplicatively changed by changing the control pressure affecting the pressure control valve.

A second advantageous embodiment of the invention provides a venturi within the bypass line and upstream of the throttle member. The throttle member and the control element are combined in a pressure control valve and the control element defines a work chamber experiencing the pressure at the narrowest part of the venturi and a control pressure chamber which receives control pressure via a line coupled to the previously mentioned valve assembly. Due to the geometrically similar construction of the air bypass and the main air conduit and by use of the pressure control valve which regulates the pressure in the venturi or the bypass line to correspond to the pressure in the venturi of the induction tube one maintains a precise proportionality of the corresponding air flow rates. By changing the control pressure for the pressure control valve via a controller that uses an engine variable, the ratio of the pressures in the two venturis and thus the proportionality of the two air streams may also be altered.

In a preferred feature of the invention, the control element of the pressure control valve includes two elastic diaphragms which are rigidly coupled and are attached to the throttle element and have a ventilated intermediate space. In yet another feature of the invention, the effective surfaces of the two diaphragms are of different size. These further features permit adaptation to particular constructional conditions of the mixture preparation system of a given engine.

The invention will be better understood as well as further objects and advantages thereof become more apparent from the ensuing detailed description of preferred exemplary embodiments taken in conjunction with the drawing.

DESCRIPTION OF THE PREFERRED EMBODIMENTS

Figure 1:
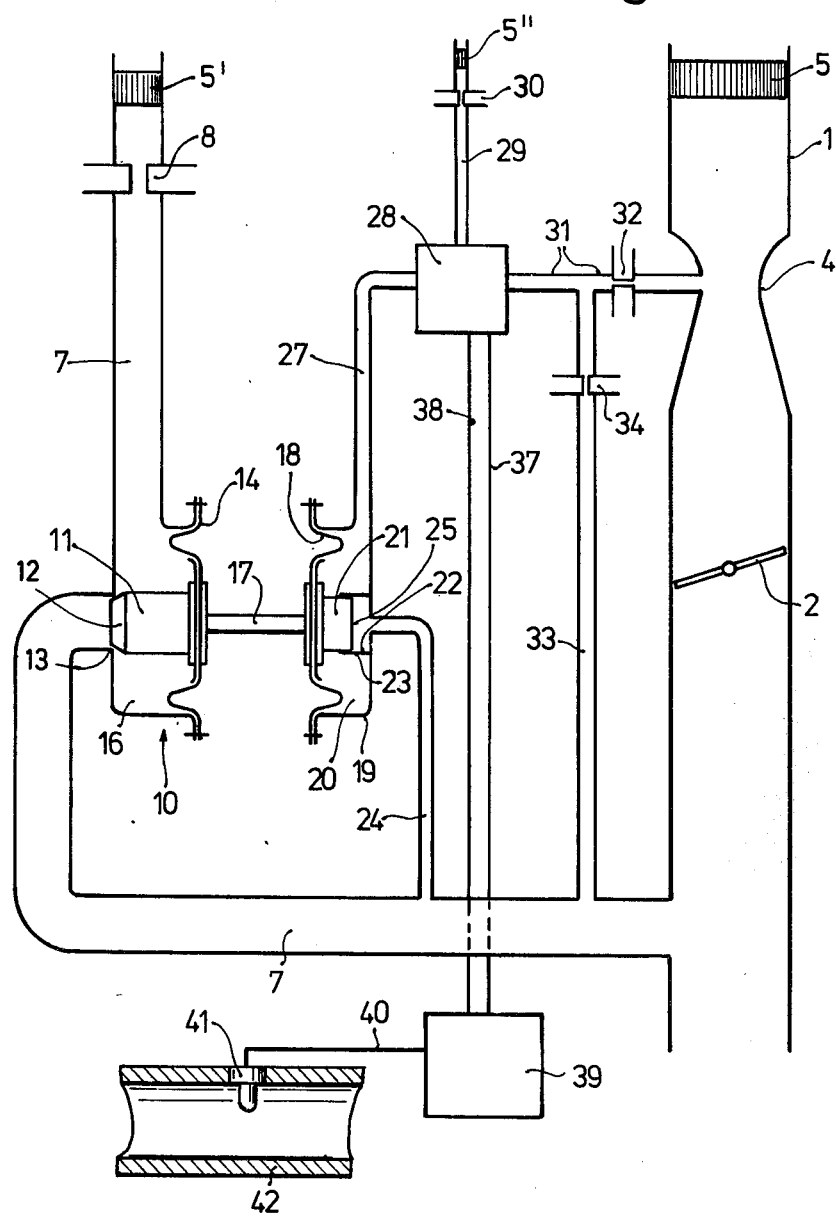
FIG. 1 is a partially sectional illustration of a first exemplary embodiment of the apparatus according to the invention.

Turning now to FIG. 1, there will be seen a schematic representation of a portion of the induction system of an internal combustion engine, which is not further illustrated. An induction tube 1 includes a main throttle plate 2 and upstream thereof a venturi 4 which may be the air flow measuring element of a mixture generator, for example a carburetor. In such a system, the fuel is metered out to the air at a point near the narrowest flow cross section of the venturi. The main throttle plate 2, which is actuated at the discretion of the vehicle operator, serves in the usual manner for regulating the overall mixture volume. An air filter 5 is provided at the inlet of the induction tube.

The apparatus includes a bypass conduit 7, the inlet of which receives ambient air through an air cleaner 5' and the terminus of which connects to the main induction tube 1 downstream of the main throttle plate 2. The filters 5 and 5' may be combined into a single unit. Downstream of the air filter 5' there is included in the bypass line a device for reducing the flow cross section and, downstream thereof, the bypass line includes a pressure control valve 10. This valve has a valve closing member 11 with a conical face 12 cooperating with an aperture 13 within the bypass line 7. The valve closing member 11 is attached to a first control diaphragm 14 which defines a work chamber 16. As illustrated, the work chamber 16 is actually a portion of the bypass line upstream of the aperture 13. The opposite surface of the first control diaphragm is exposed to atmospheric pressure and is coupled to a second control diaphragm 18 by a rigid member 17. The side of the second diaphragm facing the first diaphragm is also exposed to atmospheric pressure whereas its other side defines a pressure control chamber 20 within a housing 19. The latter side of the second diaphragm is also attached to a relief piston 21 which sealingly moves in the bore 22 of a bushing 23 extending into the pressure control chamber 20. Branching off from the bore 22 is a relief line 24 leading back to the bypass line 7 downstream of the pressure control valve whereby the face 25 of the relief piston 21 experiences the same pressure as does the conical face 12 of the valve closing element.

There is further provided a valve assembly 28 which is coupled via a pressure control line 27 with the pressure control chamber 20. The configuration of the valve assembly 28 is further depicted in various examples in FIGS. 2 to 4. The valve assembly 28 is able to obtain atmospheric air through a line 29 containing a throttle 30. The line 29 may be equipped with a further air cleaner filter 5''. In another variant construction, the line 29 may be branched off directly downstream of the air filter 5 in the induction tube 1. The valve assembly 28 is further coupled to a line 31 which is branched off from the narrowest diameter of the venturi 4 and which contains a throttle 32. Terminating in the line 31 between the throttle 32 and the valve assembly 28 is an auxiliary pressure line 33 containing a throttle 34 and leading to the main induction tube downstream of the main throttle plate 2.

Figure 2:
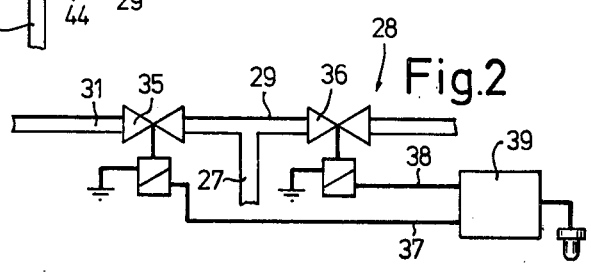
FIG. 2 is a schematic diagram of a first example of the valve assembly used in the apparatus of FIG. 1.

In the exemplary construction of the valve assembly 28 according to FIG. 2, the lines 29 and 31 are joined with the line 27. The line 29 contains an electromagnetic valve 36 and the line 31 contains an electromagnetic valve 35. Depending on the position of these electromagnetic valves, the control pressure chamber may be connected either with the narrowest portion of the venturi 4 or with atmospheric air or with the pressure in the induction tube downstream of the venturi. The electromagnetic valves are actuated via lines 37 and 38 by a controller 39. The controller receives signals from an oxygen sensor 41 via a line 40 and the sensor 41 is contained in a portion 42 of an exhaust gas system of the engine, not further shown, and provides a signal which, in known manner is converted into cyclic control pulses for actuating the electromagnetic valves 35 and 36. These valves are operated in known manner in opposite phase and with variable relative opening times. Control systems which perform the above-described services are known and will not be explained in further detail. The oxygen sensor 41 used in the apparatus of the invention, may be, for example, the known sensor which generates a signal in response to the partial pressure of oxygen in the exhaust gas. In such a sensor, when the air factor $\lambda = 1$, it generates a potential shift. Instead of using an oxygen sensor, it would be possible to transduce other operational parameters of the engine by suitable devices and use them for the control of the pressures in this apparatus. One of these variables would be, for example, the relative smoothness of rotation of the engine members. Yet another means for controlling the engine would be based on measuring the ion currents in the combustion chambers and thereby determining the chemical reactions of the mixture components in the combustion chamber. The control could also be based on methods for determining the exhaust gas composition, for example by exhaust gas temperature measurements.

The above-described apparatus which is illustrated in FIG. 1 operates in the following manner. Depending on the position of the main throttle plate 2 in the induction tube 1, the engine receives a certain air volume which is sensed with the aid of the air pressure prevailing in the narrowest portion of the venturi 4. Depending on the magnitude of the vacuum at that location, the carburetor or other mixture preparing system delivers a quantity of fuel to the flowing air. The fuel-air mixture thus provided, which is of a predetermined composition, continues to flow through the induction tube downstream of the throttle plate 2 where it receives a defined amount of supplementary air, and this amount is controlled by the pressure control valve 10. As long as the connection of the valve to ambient air via the line 29 is blocked, the pressure control chamber 20 is connected to the narrowest part of the venturi 4. In accordance with the pressure in the pressure control chamber 20, the valve regulates a constant pressure upstream of the orifice 13 in the induction tube 7 and this pressure is proportional to the pressure drop in the venturi 4 of the carburetor. Accordingly, the pressure drop across the narrowed portion 8 in the bypass is also constant so that the supplementary air admitted is proportional to the air flow rate through the induction tube. By temporary, for example cyclic, opening of the line 29 and/or closure of the line 31, it is possible to produce within the pressure control chamber an effective mixed pressure lying somewhere between the vacuum in the venturi and atmospheric pressure. Accordingly, the pressure regulated downstream of the narrowed portion 8 in the bypass line 7 is increased and the pressure drop across the narrowed portion 8 is thereby decreased, causing a reduction in the amount of supplementary air admitted. As already discussed, this manner of control takes place by means of the controller 39 which actuates the valve assembly 28 on the basis of the sensed parameters. The result is a multiplicative adjustment of the amount of supplementary air which is, in the first instance, proportional to the main air stream. The throttles 30 and 32, respectively provided in lines 29 and 31, serve for the adaptation of the control process, i.e., of the pressure increases and decreases, to desired behavior. It is possible to provide a supplementary volume for the pressure control chamber 20 in order to improve the control process by providing an integrating behavior tending to reduce pressure fluctuations.

The auxiliary pressure line 33 is provided for those operational domains in which it is impossible to obtain a clear signal from the venturi, for example when the engine idles and the air throughput is very small, as when the throttle plate 2 is closed. For these operational domains, and a suitably sized throttle 34, the induction tube vacuum prevailing downstream of the throttle plate may be used as a control pressure for the pressure control valve.

As shown in FIG. 1, the pressure control valve has a relief piston serving to pressure-relieve the valve closing member 11 in the axial direction and permitting its displacement independently of the induction tube vacuum prevailing downstream of the orifice 13. The illustrated external relief line 24 could be provided as an axial bore in the valve closing element leading from the face 5 to the conical end 12. By ventilating the space between the first and second control diaphragms and by suitably pliable construction of the diaphragms, it is possible, without the use of springs or the like, and by the use of either equal or unequal diaphragm surfaces, to produce proportional pressures in the control chamber and the work chamber, respectively. The ventilation provides a pretensioning of the diaphragm so that any pressure changes are directly controlled away without any dead time. It is possible to influence the ratio of the pressure regulated within the bypass line 7 with respect to the control pressure in the chamber 20 by disposing springs which act on the diaphragms and/or by providing diaphragm surfaces of different effective size. Furthermore, the illustrated and described valve closing member could also be replaced by other suitable throttles.

Figure 3:
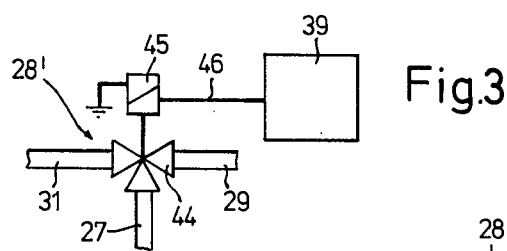
FIG. 3 is a schematic diagram of a second example of a valve assembly used in the apparatus of the invention.

FIG. 3 illustrates yet another possible construction of the valve assembly 28. In this example, a three-way valve 44 is located at the junction of the lines 29 and 31. The valve 44 may be actuated by an electromagnet 45 controlled via a line 46 by the controller 39. It would also be possible to use an electric motor for actuating the three-way valve 44. The control takes place in the same way as already described with respect to FIG. 2, in dependence on a variable related to the operational condition of the engine. The three-way valve may be operated in analog, i.e., continuous manner or it may be embodied as a switching valve which is operated cyclically and which causes alternate communication of the line 27 with the line 31 or the line 29. The valve would be controlled in the same manner as the magnetic valves 35 and 36, already described with respect to the example of FIG. 2. The actuation may take place at some fixed frequency or an rpm-dependent frequency with variable pulse width to alter the relative opening time of the lines 31 and 29.

Figure 4:
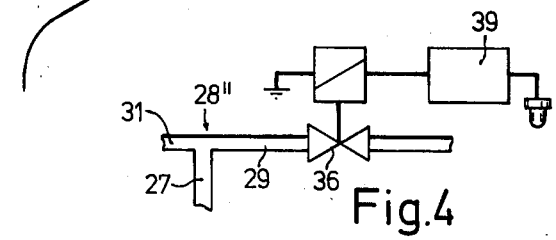
FIG. 4 is a schematic diagram of a third example of a valve assembly for the invention.

In a simplified construction of the valve assembly 28 illustrated in FIG. 4, only a single electromagnetic valve 36 is located for example in the line 29. Both analog and cyclic actuation of this valve is possible. Suitable dimensioning of the throttles 30 and 32 permits locating the valve in the line 31.

Figure 5:
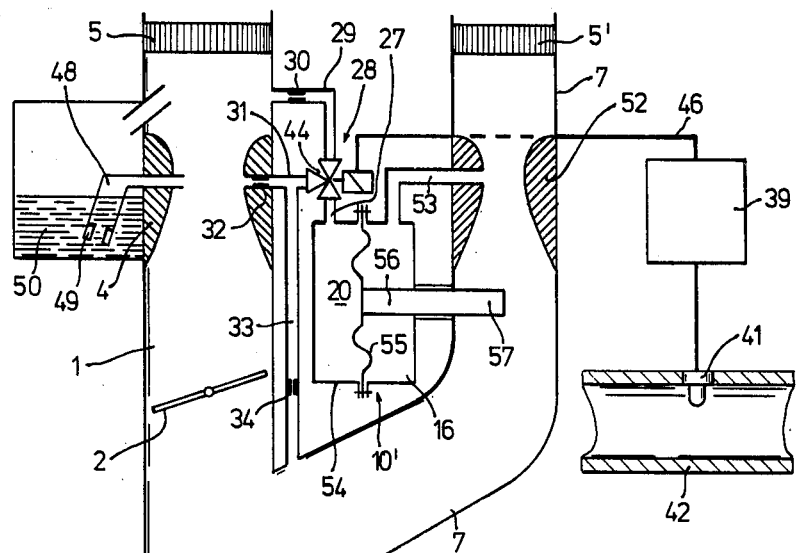
FIG. 5 is a partially sectional diagram of a second exemplary embodiment of the invention.

FIG. 5 illustrates a second exemplary embodiment of the invention. This embodiment is substantially similar to that already described and illustrated in FIG. 1. Again, an induction tube 1 receives air through a filter 5 in accordance with the position of the throttle plate 2 and the rpm of the engine. The venturi 4 located upstream of the throttle plate 2 translates the amount of air into a vacuum with respect to the pressure upstream of the venturi. Depending on the amount of air flow, there is admitted to the narrowest portion of the venturi fuel from a float chamber 50 via a line 48 containing the main fuel nozzle 49. The amount of fuel is determined by the magnitude of the pressure difference obtaining between the narrowest part of the venturi and the pressure in the float chamber upstream of the venturi.

As in the exemplary embodiment of FIG. 1, there is provided here a bypass line 7 which terminates in the induction tube 1 downstream of the throttle plate 2. At the inlet, the bypass line 7 has a filter 5' which may be combined with the filter 5 in a single unit. By contrast to the embodiment of FIG. 1, the bypass line 7 in this embodiment also contains a venturi 52 which is geometrically similar to the venturi 4 in the induction tube 1. A line 53 connects the narrowest part of the venturi 52 to the work chamber 16' of the pressure control valve 10'. In this case, the pressure control valve 10' has a closed housing 54 in which is clamped a control diaphragm 55. The diaphragm is connected to an actuating rod 56 which is sealingly guided to the outside where it actuates a slide 57 downstream of the venturi 52 within the bypass line 7. The pressure control chamber 20 defined by the diaphragm 55 is coupled via the line 27 with the valve assembly 28. In the example illustrated in FIG. 5, the valve assembly 28 has a three-way valve 44 which is connected via the line 29 and the throttle 30 to the induction tube 1 immediately downstream of the intake filter 5. Furthermore, the line 31 leads from the three-way valve 44 through the throttle 32 to the narrowest part of the venturi 4. The auxiliary line 33 branches off from the line 31 between the throttle 32 and the valve 44 and leads to the induction tube downstream of the main throttle plate 2. This line contains the throttle 34. The three-way valve is again actuated over the line 46 by a controller 39 which uses the signal from an oxygen sensor 41 located in a part 42 of an exhaust gas system, not further shown.

The manner of operation of the exemplary embodiment of the invention illustrated in FIG. 5 is substantially the same as that of the embodiment of FIG. 1. By contrast thereto however, the pressure in the venturi 4 of the induction tube 1 is here compared with the pressure in a geometrically similar venturi 52 located in the bypass line 7. The slide 57 makes it possible to obtain the same pressure conditions at the venturi 52 as prevail at the venturi 4 as long as the line 29 is closed. Under those conditions, the bypass line carries a supplementary air stream which is proportional to the main air flow rate. However, this proportionality may be changed by means of the controller 39 which actuates the valve assembly 28 in dependence on a control variable. The valve assembly 28 may be any one of those already described and illustrated in FIGS. 2–4. Furthermore, it would be possible to use a double diaphragm as in the first embodiment of FIG. 1 instead of the single diaphragm 55. The slide 57 actuated by the control diaphragm 55 or another suitable diaphragm may instead be replaced by a suitable throttle valve within the bypass conduit. As in the previous example, the throttles 30, 32 and 34 serve for the adaptation of the prevailing pressure changes to one another and for the improvement of the pneumatic integrating effect. The advantage of the embodiment of FIG. 5 over that of FIG. 1 is that, when the pressure in the narrowest part of the venturi 52 in the bypass line decreases, there is available a higher pressure for comparison and control of the pressure control valve. This embodiment also permits a multiplicative and rapidly acting influence on the amount of supplementary air admitted to the mixture provided by the carburetor or other mixture producing system. If it is desired to obtain a constant air quantity or a constant degree of cylinder charging, the supplementary air may be introduced in the induction tube region lying between the mixture generator or the venturi 4 and the throttle plate.

The foregoing relates to preferred exemplary embodiments of the invention, it being understood that other embodiments and variants thereof are possible within the spirit and scope of the invention, the latter being defined by the appended claims.

What is claimed is:

1. An apparatus for controlling the fuel-air mixture in an internal combustion engine, said engine including an air induction tube containing a main venturi and a throttle plate, and mixture generating means, said apparatus comprising:
    an air bypass conduit, for feeding air selectively to said induction tube downstream of the effective location of said mixture generating means and containing a flow restriction;
    an air flow control valve, located in said bypass conduit downstream of said flow restriction and having a movable valve member for varying the pressure in said bypass conduit by being subjected selectively to actuating pressure from said induction tube and to actuating pressures from separate sources of pressure;
    a valve assembly for selecting the actuating pressure admitted to said air flow control valve;
    a regulator for actuating said valve assembly and thereby regulate the pressure in said bypass conduit; and
    transducer means, responsive to engine conditions, for generating control signals for governing the operation of said regulator.

2. An apparatus for controlling the fuel-air mixture in an internal combustion engine, said engine including an air induction tube containing a main venturi and a throttle plate, and mixture generating means, said apparatus comprising:
    an air bypass conduit, for feeding air selectively to said induction tube downstream of the effective location of said mixture generating means and containing a bypass venturi;
    an air flow control valve, located in said bypass conduit downstream of said bypass venturi and having a movable valve member for varying the pressure in said bypass conduit by being subjected selectively to actuating pressure from said induction tube and to actuating pressures from separate sources of pressure;
    a valve assembly for selecting the actuating pressure admitted to said air flow control valve;
    a regulator for actuating said valve assembly and thereby regulate the pressure in said bypass conduit; and
    transducer means, responsive to engine conditions, for generating control signals for governing the operation of said regulator.

3. An apparatus as defined by claim 2, wherein said bypass venturi is geometrically similar to the main venturi in said induction tube.

4. An apparatus as defined by claim 1, wherein said movable valve member in said air flow control valve includes at least one control diaphragm.

5. An apparatus as defined by claim 1, wherein said movable valve member of said air flow control valve includes two mutually coupled diaphragms and a valve closing element, the space between said two diaphragms being exposed to atmospheric air.

6. An apparatus as defined by claim 5, wherein the effective surfaces of said two diaphragms are different.

7. An apparatus as defined in claim 5, wherein said valve closing element is pressure-relieved.

8. An apparatus as defined by claim 7, wherein said valve closing element is a substantially conical element cooperating with an orifice in said bypass conduit, there being attached coaxially with said valve closing member a pressure-relief piston exposed to the pressure prevailing in said bypass conduit downstream of said air flow control valve.

9. An apparatus as defined by claim 1, further comprising a source of constant pressure, preferably atmospheric pressure connected to said valve assembly, and a conduit from the narrowest part of said main venturi in said induction tube to said valve assembly; whereby the pressure exerted on said air flow control valve may be selectively altered by said valve assembly.

10. An apparatus as defined by claim 9, wherein the connecting line between said valve assembly and said main venturi contains a throttle and wherein the connecting line between said valve assembly and said source of pressure contains a throttle and wherein there is provided an auxiliary line containing a throttle and connecting said line between said valve assembly and said main venturi with the induction tube downstream of said throttle plate.

11. An apparatus as defined by claim 9, wherein said valve assembly is a valve in the line between said valve assembly and said source of constant pressure.

12. An apparatus as defined by claim 9, wherein said valve assembly is a valve in the line between said valve assembly and said main venturi.

13. An apparatus as defined by claim 9, wherein said valve assembly includes an electromagnetic valve in the line between said valve assembly and said constant pressure and a second electromagnetic valve in the line between said valve assembly and said main venturi, said first and second electromagnetic valves being cycled in opposing phase with an opening ratio determined by said regulator.

14. An apparatus as defined by claim 9, wherein said valve assembly includes a three-way valve in the junction of the lines leading to said valve assembly.

15. An apparatus as defined by claim 9, wherein said valve assembly includes electromagnetic valves actuated continuously by said regulator.

16. An apparatus as defined by claim 9, wherein said valve includes electromagnetic valve elements actuated cyclically with variable keying ratio controlled by said regulator.

* * * * *